US011537709B2

(12) United States Patent
Blanco et al.

(10) Patent No.: US 11,537,709 B2
(45) Date of Patent: Dec. 27, 2022

(54) DEVICE SUCH AS A CONNECTED OBJECT PROVIDED WITH MEANS FOR CHECKING THE EXECUTION OF A PROGRAM EXECUTED BY THE DEVICE

(71) Applicant: Idemia Identity & Security France, Courbevoie (FR)

(72) Inventors: Fabien Blanco, Courbevoie (FR); Jean-Yves Bernard, Courbevoie (FR)

(73) Assignee: IDEMIA IDENTITY & SECURITY FRANCE, Courbevoie (FR)

( * ) Notice: Subject to any disclaimer, the term of this patent is extended or adjusted under 35 U.S.C. 154(b) by 295 days.

(21) Appl. No.: 16/911,867

(22) Filed: Jun. 25, 2020

(65) Prior Publication Data

US 2021/0011756 A1 Jan. 14, 2021

(30) Foreign Application Priority Data

Jul. 11, 2019 (FR) ........................ 1907796

(51) Int. Cl.
*G06F 21/52* (2013.01)
*G01R 31/317* (2006.01)
(Continued)

(52) U.S. Cl.
CPC ....... *G06F 21/52* (2013.01); *G01R 31/31705* (2013.01); *G01R 31/31713* (2013.01);
(Continued)

(58) Field of Classification Search
CPC .................................. G06F 1/32; G06F 9/44
See application file for complete search history.

(56) References Cited

U.S. PATENT DOCUMENTS 7,882,396 B2    2/2011  Bolignano et al.
2009/0113210 A1*  4/2009  Westerinen ............. G06F 21/52
                                                      713/187

(Continued)

FOREIGN PATENT DOCUMENTS

EP    1 702 268 A2    9/2006
EP    3 382 588 A1   10/2018
(Continued)

OTHER PUBLICATIONS

Correspondence from the French National Institute of Industrial Property Office (INPI—Institute National De La Propriété Industrielle) for FR1907796 dated Mar. 27, 2020; Preliminary Research Report of the French National Institute of Industrial Property Office for FR1907796 dated Mar. 23, 2020; and Written Opinion on the Patentability of the Invention issued by the French National Institute of Industrial Property Office for FR1907796.
(Continued)

*Primary Examiner* — Keshab R Pandey
(74) *Attorney, Agent, or Firm* — Womble Bond Dickinson (US) LLP

(57) ABSTRACT

The present invention relates to a device (1) such as a connected object comprising a first electronic circuit (2) comprising:
  a first processing unit (6) for executing a program,
  a first memory (8) for memorizing data during the execution of the program,
  a debug port (10) dedicated to checking the execution of the program from outside the first circuit,
a second electronic circuit (4) connected to the debug port (10), comprising:
  a second memory (14) memorizing reference data related to the program,
  a second processing unit (12) for implementing the following steps automatically and autonomously via the debug port (10): checking the integrity of the data memorized by the first memory (8) and/or the compliance of the program's execution by the first processing unit (6) with a reference execution, assisted by the reference data.

15 Claims, 4 Drawing Sheets

(51) Int. Cl.
  *G06F 21/56* (2013.01)
  *G06F 21/64* (2013.01)
  *G06F 9/38* (2018.01)
  *G06F 9/4401* (2018.01)
  *G06F 9/48* (2006.01)

(52) U.S. Cl.
  CPC .......... *G06F 9/3836* (2013.01); *G06F 9/3877* (2013.01); *G06F 9/4418* (2013.01); *G06F 9/485* (2013.01); *G06F 21/566* (2013.01); *G06F 21/64* (2013.01); *G06F 2221/033* (2013.01)

(56) References Cited

U.S. PATENT DOCUMENTS

| | | | |
|---|---|---|---|
| 2010/0070804 A1 | 3/2010 | Bolignano et al. | |
| 2010/0263043 A1* | 10/2010 | Xu | G06F 11/26 726/17 |
| 2011/0175624 A1* | 7/2011 | Wong | G01R 31/31905 324/538 |
| 2016/0124822 A1* | 5/2016 | Remple | G06F 11/267 714/30 |
| 2018/0285189 A1 | 10/2018 | Sere et al. | |

FOREIGN PATENT DOCUMENTS

| WO | 2005/073859 A1 | 8/2005 |
|---|---|---|
| WO | 2009/055147 A1 | 4/2009 |

OTHER PUBLICATIONS

English translation of Correspondence from the French National Institute of Industrial Property Office (INPI—Institute National De La Propriété Industrielle) for FR1907796 dated Mar. 27, 2020; Preliminary Research Report of the French National Institute of Industrial Property Office for FR1907796 dated Mar. 23, 2020; and Written Opinion on the Patentability of the Invention issued by the French National Institute of Industrial Property Office for FR1907796.

\* cited by examiner

[Fig. 1]
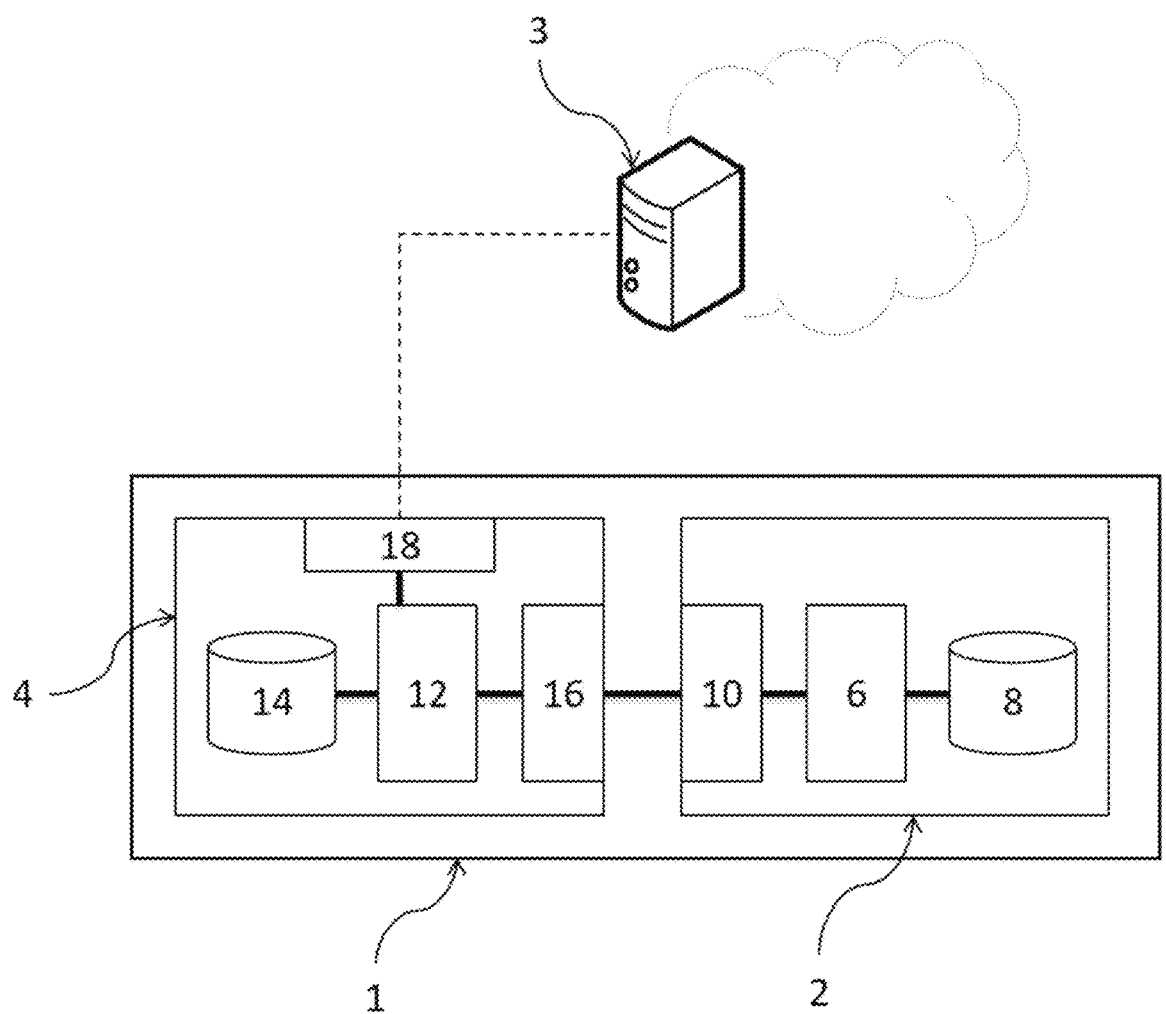

[Fig. 2]
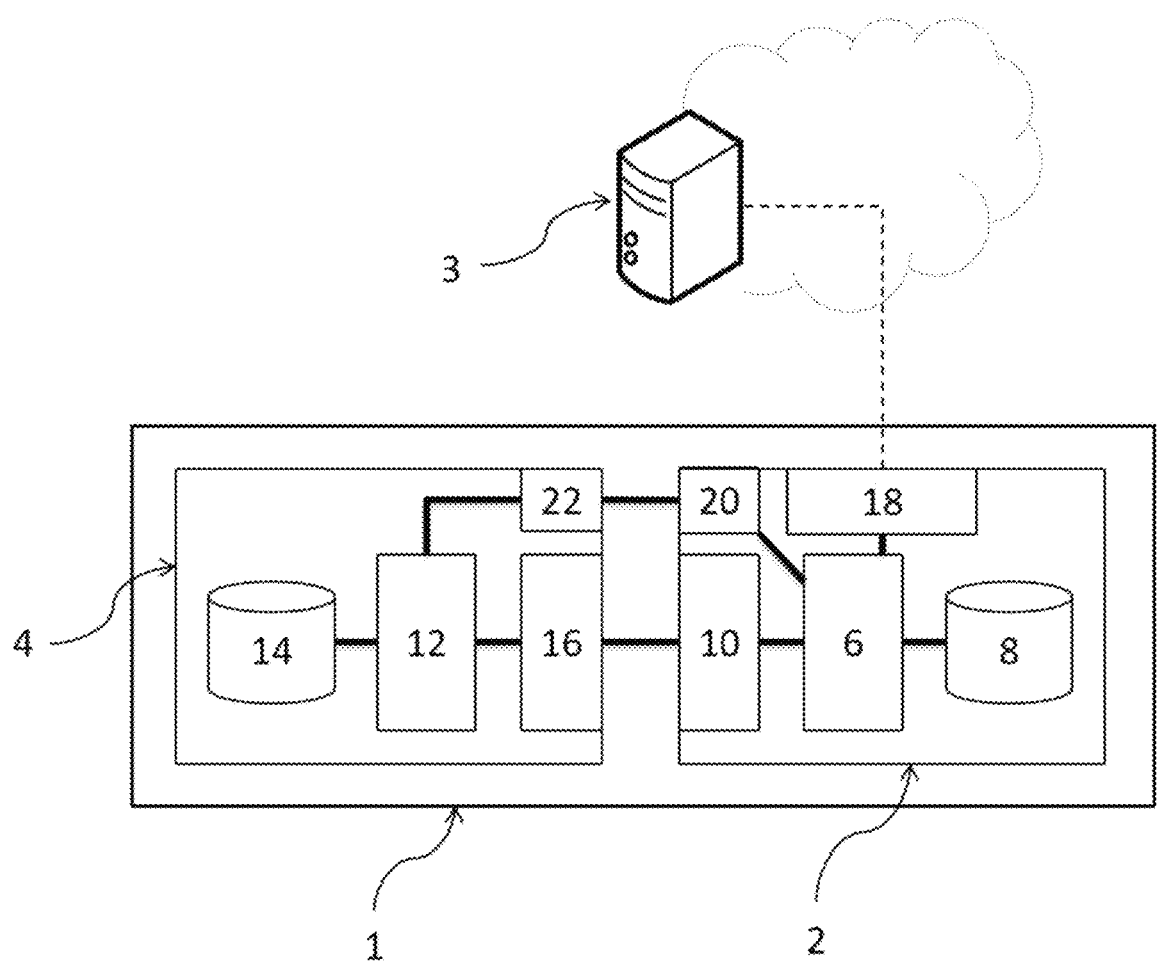

[Fig. 3]
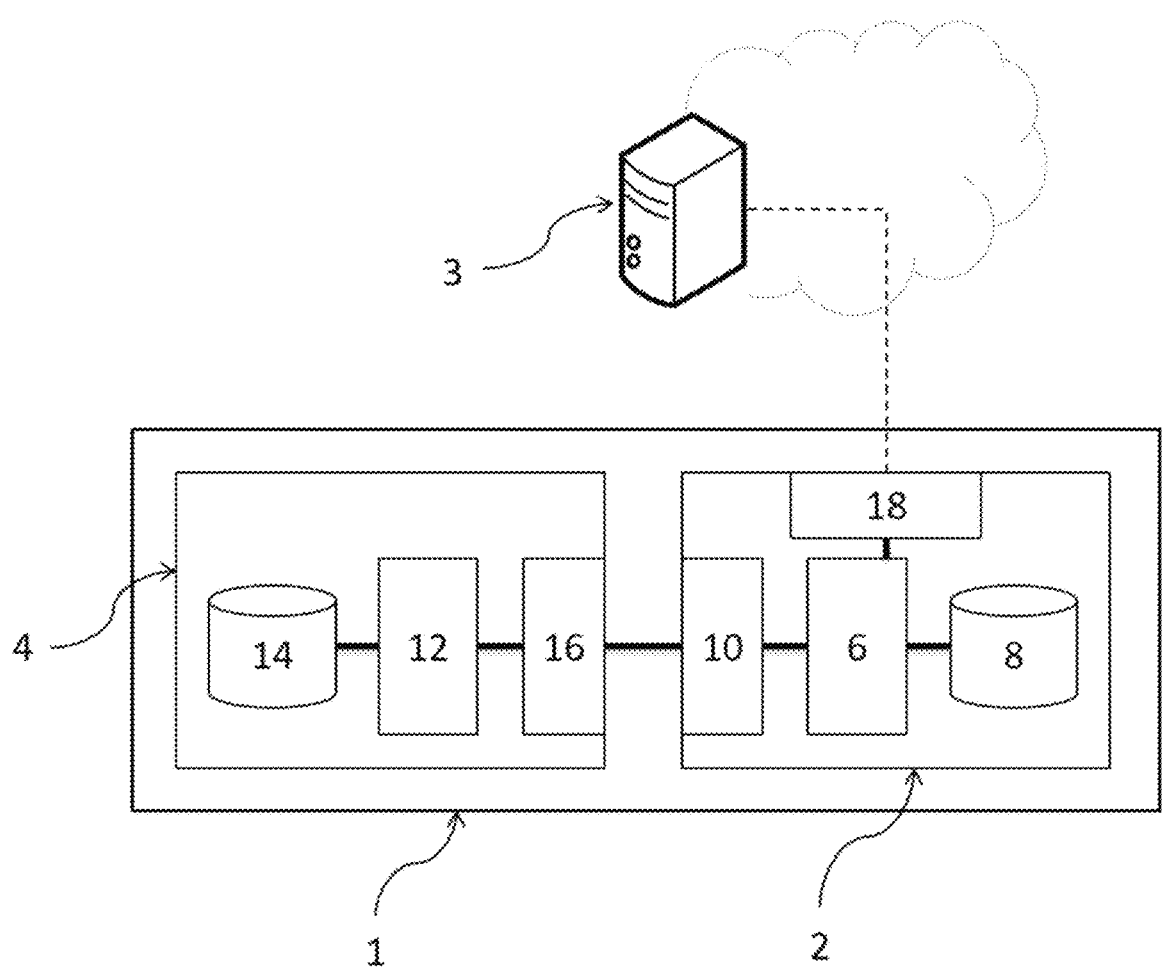

[Fig. 4]
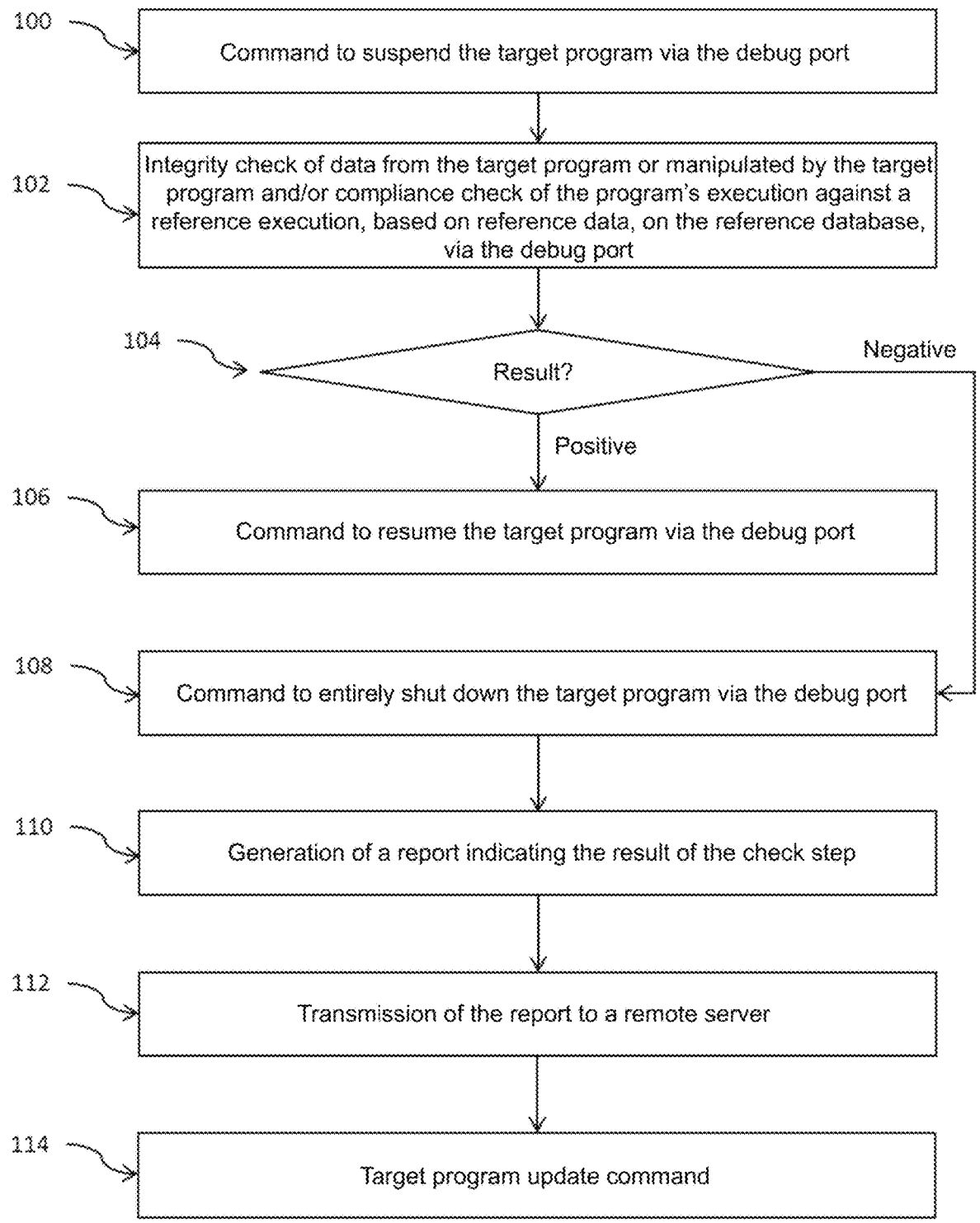

DEVICE SUCH AS A CONNECTED OBJECT PROVIDED WITH MEANS FOR CHECKING THE EXECUTION OF A PROGRAM EXECUTED BY THE DEVICE

CROSS-REFERENCE TO RELATED APPLICATIONS

This specification is based upon and claims the benefit of priority from French patent application number FR 1907796 filed on Jul. 11, 2019, the entire contents of which are incorporated herein by reference.

TECHNICAL FIELD OF THE INVENTION

The present invention relates to a device comprising an electronic circuit adapted to execute a program that may be corrupted by attacks.

The present invention is particularly applicable in the field of connected objects.

STATE OF THE ART

A non-secure electronic circuit executing a program is typically sensitive to a plurality of attack vectors, whether via hardware or software attacks.

It is difficult to implement generic means for securing an electronic circuit executing a microcontroller or microprocessor program without that electronic circuit requiring that either the program or the hardware be modified. In both cases, the modifications to be made represent a substantial cost due to the expertise or hardware required.

OVERVIEW OF THE INVENTION

One purpose of the described invention is to check whether a non-secure electronic circuit has suffered an attack that alters its functionality, without the implementation of that check leading to any additional cost in manufacturing the electronic circuit being checked.

Another purpose of the invention is to make it so that this check can be easily implemented for a wide variety of existing electronic circuits.

Therefore, a first aspect of the invention proposes a device such as a connected object comprising a first electronic circuit comprising:
 a first processing unit configured to execute a program,
 a first memory configured to memorize data from the program or manipulated by the program during its execution,
 a debug port dedicated to checking the execution of the program from outside the first circuit, the device further comprising a second electronic circuit connected to the debug port, the second electronic circuit comprising:
 a second memory memorizing reference data related to the program,
 a second processing unit configured to implement the following steps automatically and autonomously via the debug port: checking the integrity of the data memorized by the first memory and/or the compliance of the program's execution by the first processing unit with a reference execution, assisted by the reference data.

A debug port is commonly used to detect, reproduce, and analyze the bugs found in a program executed by an electronic circuit while it is being developed. The conventional use of a debug port is as follows: a developer manually monitors and checks the execution of a bugged program of a circuit from a workstation by means of a debugging program (or debugger) and such a debug port. The debugging carried out by developers in this manner is an empirical task that substantially depends on their general computing knowledge, their knowledge of the checked program's source code, their past experience in debugging, and their intuition. In the device according to the first aspect of the invention, the debug port is cleverly diverted from its normal use in order to implement a fully automatic and autonomous integrity check ("automatic and autonomous" means without human intervention). By relying on reference data memorized by the second electronic circuit, this integrity check makes it possible to detect whether that execution complies with pre-established rules or not, in which case it is possible that the first electronic circuit has been attacked.

Additionally, as most existing electronic circuits equipped with a processing unit (particularly micro-controllers or processors) have such a debug port, the invention can be applied to a wide variety of circuits.

Furthermore, as the integrity check is commanded from outside of the first electronic circuit, in this case by the second electronic circuit, it is not necessary to thoroughly modify the first electronic circuit.

The device according to the first aspect of the invention may also comprise the characteristics stated in the dependent claims.

Preferably, the steps implemented automatically and autonomously by the second processing unit further comprise a program suspension command, the integrity check and/or compliance step being implemented while the program is suspended.

Preferably, the suspension command comprises the placement of a stopping point at a predetermined location in the program, so as to suspend the program at the predetermined location, or the placement of an observation point on a variable of the program, so as to suspend the program when the variable is modified.

Preferably, the steps implemented automatically and autonomously by the second processing unit comprise a step consisting of verifying whether a condition independent of the way in which the program is being executed has been met, such as verifying whether a predetermined period of time has elapsed since a previous start of the program, a previous resumption of the program, or a previous powering-on of the device, the suspension command step being implemented when the condition is met.

Preferably, the steps implemented automatically and autonomously by the second processing unit comprise the command for the first processing unit to resume the program when the program or the data manipulated by the program is revealed not to have been compromised during the check step, said command is not implemented when the program or the data manipulated by the program is revealed to have been compromised during the check step.

Preferably, the steps implemented automatically and autonomously by the second processing unit comprise a command for a definitive program stop and/or for a reconfiguration of the first electronic circuit in a state which prevents subsequent execution of the program by the first processing unit, when the program or the data manipulated by the program is revealed to have been compromised during the check step.

Preferably, the steps implemented automatically and autonomously by the second processing unit comprise the generating of a report indicating whether the program or the data manipulated by the program was revealed to have been compromised during the check step.

Preferably, the device comprises a communication interface with the world outside the device configured to transmit the generated report to a remote server away from the device.

Preferably, the steps implemented automatically and autonomously by the second processing unit comprise a command to transmit the report to the server via the communication interface while the program is suspended.

Preferably, the communication interface is configured to transmit the report to the server without the report going through the first electronic circuit. In one variant, the communication interface is part of the first electronic circuit.

Preferably, the steps implemented automatically and autonomously by the second processing unit comprise the commanding, via the debug port, that the report be written in an exchange zone allocated in the first memory, so that the report can thereafter be relayed to the server via the communication interface.

The first electronic circuit may comprise a second port distinct from the debug port, and the steps implemented automatically and autonomously by the second processing unit may comprise the commanding that the report be transmitted to the communication interface via the second port, so that the error message can thereafter be relayed to the server via the communication interface.

Preferably, the reference data indicate a sequence of events that occur in a predetermined order during the reference execution of the program, and wherein the compliance check of the program's execution against a reference execution comprises a comparison between the predetermined order and an order in which the events occur during the execution of the program by the first processing unit.

Preferably, the steps implemented automatically and autonomously by the second processing unit comprise a program update command when the program or the data manipulated by the program is revealed not to have been compromised during the check step.

Preferably, the first memory memorizes a first version of the program and a second version of the program before the update command, the first processing unit is configured to execute selectively the first version of the program before the update and wherein the update command comprises the sending to the first electronic circuit, via the debug port, of at least one command which requests the first processing unit to execute selectively the second version of the program stored in the first memory in place of the first version of the program.

Alternatively, the first processing unit is configured to execute a first version of the program before the update and the update command comprises the sending to the first electronic circuit, via the debug port, of a second version of the program obtained by the second electronic circuit so that the first processing unit executes the second version of the program in place of the first version of the program.

Preferably, the update command comprises a download of the second version of the program from a remote server of the device, or a reading of the second version of the program in a device memory, such as the second memory.

Preferably, the second version is read in the device memory only when an attempt to establish a secure communication channel between the second processing unit and the server fails.

Preferably, the update command comprises verification of a digital signature of the second version of the program, or decryption of the second version of the program.

Additionally, a second aspect of the invention proposes a method implemented in a device such as a connected object, the device comprising:
  a first electronic circuit comprising a first processing unit configured to execute a program, a first memory configured to memorize the data from the program or manipulated by the program during its execution, and a debug port dedicated to checking the execution of the program from outside the first circuit,
  a second electronic circuit connected to the debug port and comprising a second memory memorizing reference data related to the program,
the method comprising the following steps implemented by a second processing unit of the second electronic circuit, automatically and autonomously via the debug port: checking the integrity of the data memorized by the first memory and/or the compliance of the program's execution by the first processing unit with a reference execution, assisted by the reference data.

The invention also proposes a computer program product comprising program code instructions for executing the steps of the method according to the second aspect of the invention, when that method is executed by a processing unit.

DESCRIPTION OF THE FIGURES

Other characteristics, goals, and advantages of the invention will become clear from the following description, which is purely illustrative and non-limiting, which must be read in the context of the attached drawings.

FIGS. 1 to 3 schematically depict the devices according to three different embodiments of the invention.

FIG. 4 is a flowchart of the steps of a method that may be implemented by one of the devices depicted in FIGS. 1 to 3.

In the set of figures, similar elements are marked with identical references.

DETAILED DESCRIPTION OF THE INVENTION

With reference to FIG. 1, a device 1 comprises a first electronic circuit 2 and a second electronic circuit 4 distinct from the first electronic circuit 2.

The first electronic circuit 2 comprises a first processing unit 6, a first memory 8, and a debug port 10.

The first processing unit 6 is configured to execute a computer program, which will hereafter be called the "target program". The first processing unit 6 typically comprises one or more processors.

The first memory 8 is configured to memorize data from the target program or manipulated by the target program during its execution. The first memory 8 typically comprises at least one non-volatile memory unit (flash, EEPROM, NVM, etc.) configured to store the target program and data persistently, and at least one volatile memory unit (RAM, registers, etc.), configured to memorize program instructions to be executed or data temporarily manipulated by the program during its execution.

In particular, the memory 8 is accessible via the debug port 10.

The debug port 10 is dedicated to checking the execution of the target program from outside the first electronic circuit 2. The debug port 10 constitutes a communication interface between the target program and the world outside of the first electronic circuit 2.

The debug port 10 is, for instance, a TAP or JTAG port defined by one of the known JTAG specifications (for example IEEE 1149.1 or IEEE 1149.9), or an SWD port.

The first electronic circuit 2 may be: an FPGA, an ASIC, a microcontroller, etc.

The second electronic circuit 4 comprises a port 16, a second processing unit 12, and a second memory 14.

The port 16 is connected directly to the debug port 10 of the first electronic circuit 2.

The second processing unit 12 is configured to execute a program called the "check program". A function of the check program is to check the integrity of the data saved in the first memory 8 during the execution of the target program (in particular, portions of the target program itself, data manipulated by the target program during its execution), or execution context data, such as the program counter or registers of the processing unit, and to verify the progress of the program of the second processing unit 6 (via a valid sequence of stop points that are reached).

The check program comprises in particular (but not exclusively) instructions adapted to implement features found in a traditional debugger, such as the placement of stop points in the target program.

The second memory 14 is configured to memorize reference data related to the target program (examples of such reference data are given hereafter).

The second memory 14 typically comprises at least one non-volatile memory unit (flash, EEPROM, NVM, etc.) configured to store the check program and/or the reference data persistently, and at least one volatile memory unit (RAM, registers, etc.), configured to memorize check program instructions to be executed or data temporarily manipulated by the check program during its execution.

The first electronic circuit 2 may be: An FPGA, an ASIC, etc.

Preferably, the second electronic circuit 4 is made even more secure against outside attacks than the first electronic circuit 2. In some fields, the term "secure element" (or SE for short) is used to designate a circuit that has a high level of security, and the term "microcontroller" (or MCU for short) is used to designate a circuit that has a comparatively low level of security. The first electronic circuit 2 may therefore be considered an SE, and the second electronic circuit 4 may be considered an MCU.

The device 1 is, for instance, a connected object, or itself an electronic circuit such as a system-on-chip (SoC).

The device 1 further comprises a communication interface 18 with a remote server 3 typically a wireless radio communication interface (W-Fi, NFC, Bluetooth, 3/4/5G, etc.) or a wired one (connected directly, e.g. via Ethernet, or indirectly, by means of an $I^2C$ bus controlling a radio transmitter acting as a relay between the interface 18 and the server 3).

When the device 1 is a connected object, the remote server 3 is able to communicate with a network of connected objects which the device 1 is meant to join. A particular function of the server 3 is to collect information communicated by the various connected objects such as the object 1.

As we shall see later on, the second electronic circuit 4 and the server 3 may exchange information via different paths.

In the first embodiment depicted in FIG. 1, the communication interface 18 is part of the second electronic circuit 4, and the first electronic circuit does not necessarily comprise a direct communication interface with the world outside of the device 1 (though this is possible). This has the benefit of preventing the second electronic circuit from being "at the mercy" of the first electronic circuit 2 in order to be able to communicate with the outside world: If the first electronic circuit 2 does not perform the actions needed to relay messages coming from the second electronic circuit 4, then that circuit 4 cannot communicate with the outside world.

FIG. 2 depicts a second embodiment of the device 1, wherein the communication interface 18 is part of the first electronic circuit 2. This has the benefit of avoiding needless additional costs, constraints, or limitations in a device 1 whose first electronic circuit 2 has hardware to communicate with the outside world.

However, the second electronic circuit 4 still needs to communicate with the server 3 located outside the device 1. To that end, the first electronic circuit 2 comprises a port 20 separate from the debug port 10, and the second electronic circuit 4 comprises a port 22 connected to the port 20 by a link independent of the link that connects the port 16 to the debug port 10. The port 20 is connected to the first processing unit 6. The link between the ports 20 and 22 is, for instance, a bus I2C.

In this second embodiment, the program executed on the first processing unit 6 is assured of receiving (or transmitting) data from the first electronic circuit 2 to (or from) the server 3 owing to its ability to communicate with the outside world, provided by the communication interface 18. In the present case, the success of the communication between the second electronic circuit 4 and the server 3 is therefore assured by the cooperation of the program executed on the first electronic circuit 2.

This configuration may be particularly adapted, but not limited, to cases where the second electronic circuit 4 is providing the first electronic circuit 2 with related functions, in which case the circuit 2 may make requests to the circuit 4, which in such a case behaves as a traditional slave component on an embedded communication bus (as described above, e.g. $I^2C$).

FIG. 3 depicts a third embodiment, in which the communication interface 18 is part of the first electronic circuit 2, as in the second embodiment. However, unlike the second embodiment depicted in FIG. 2, the second electronic circuit communicates with the server 3 by means of the debug port 10, rather than by means of an additional port. This makes it possible to simplify the architecture of the device 1 compared to the second embodiment. The debug port 10 serves not only to manage communications between circuits 2 and 4 (within the device 1), but also to manage communications between the second electronic circuit 4 and the server 3.

The device 1 is configured as follows in a preliminary configuration phase.

The code of the target program is compiled, so as to produce an executable that is meant to be executed on the first electronic circuit 2.

After compiling, integrity data are calculated on predetermined segments of the target program code.

A list of addresses of the target program is determined in order to place the stopping points there.

The code of the target program is loaded in the first memory 8, so that it can then be executed by the first processing unit 6.

Furthermore, the determined list of addresses and the integrity data are memorized in the second memory 14 as reference data. Each address is associated in the memory with at least one item of integrity data.

The code of the check program is loaded in the second memory 14, so that it can then be executed by the first processing unit 12.

The preliminary configuration phase of the device 1 is then completed.

With reference to FIG. 3, the following steps are implemented during a later phase of using the device 1, once it has been powered on.

The second processing unit 12 commands that the target program executed by the first processing unit 6 be suspended (step 100).

Different target program suspension policies may be implemented, either alone or in combination.

The second processing unit 12 may, for instance, place stop points defined by the reference data (in the sense that the reference data point to specific locations in the program code, at which the execution of the program will be suspended). This placement of stop points is typically implemented when the first electronic circuit 2 (or more generally, the device 1) is powered on, via an appropriate command issued by the first electronic circuit 2 passing through the debug port 10, before the target program starts or shortly after it is started by the first processing unit 6.

The execution of the program is suspended whenever the execution pointer reaches one of the addresses where a stop point was placed.

One advantage of a suspension by means of stop points is being able to deterministically target critical parts of the target program that are most likely to be corrupted by attacks, or target areas that have little impact on operations that must not be interrupted (for better system stability).

The second processing unit 12 can also command the suspension of placing observation points at the variables of the target program. In such a case, a suspension occurs when the variable is modified.

Additionally, the circuit 4 can repeatedly verify (based on a fixed or random period, for instance) that the stop or observation points placed are always present.

The second processing unit 12 may also suspend the target program when a condition independent of the way in which the program is executed has been met.

The condition is, for instance, a time condition: The second processing unit triggers the suspension once a predetermined period of time has elapsed since the target program started or previously resumed. To that end, the second processing unit 12 has a time counter that is reset whenever the target program is started or resumed.

Some attacks may cause the execution pointer to no longer go through addresses where stop points were placed, or no longer modify variables where observation points were placed, which is harmful. The advantage of a suspension triggered by meeting a condition independent of the way in which the program is executed is therefore that it can guarantee that there will be a suspension, regardless of the locations in the target program that the execution pointer of the first processing unit 6 goes through and regardless of the variables that the target program modifies. This advantage is particularly attained when using a time condition for triggering the suspension.

While the target program is suspended, the second processing unit 12 implements an integrity check on the program or on the data manipulated by that program and/or a compliance check of the program's execution by the first processing unit 6 against a reference execution. In order to carry out such checks, the second processing unit 12 accesses the second memory 14 to read it, based on the reference data that is memorized in the second memory 14 (step 102).

The check step 102 covers any processing that implements consistency checks on the execution and integrity of the program and/or its data so as to detect alterations to that same program or anomalies in execution that could be the consequence of random events, but also could have been generated by an attacker (a buffer overflow, for instance).

A first type of check that may be implemented during step 102 relates to the integrity of the program, or of data manipulated by that program.

Typically, when the target program is suspended, the second processing unit 12 verifies whether an item of data to be checked found in the first memory 8 and an item of integrity data that is part of the reference data memorized in the second memory 14 are consistent. The second processing unit 12 may, for instance, compare the integrity data and the data to be checked, in which case both items of data are considered consistent when their values are identical.

However, verifying consistency between an item of integrity data and an item of data to be checked may be more complex than a simple comparison. One of the items of input data of the consistency verification may, for instance, undergo a transformation, and the result of that transformation may be compared with the other data. Both items of input data of the consistency verification may also undergo respective transformations, and the results of those two transformations may then be compared.

The consistency verification may be repeated for multiple items of reference data (whenever multiple items of integrity data have been associated with the same address, for instance).

For instance, an item of data of the first electronic circuit 2 to be checked during the integrity check step is a global variable.

The integrity check 102 produces two possible results: a positive result, in the event of consistency between the integrity data and the data to be checked, and a negative result otherwise (inconsistency between the data). This negative result reveals that the target program, or data manipulated by the target program, has been compromised.

A second type of check that may be implemented during the step 102 relates to the question of whether the program is being executed in a manner compliant with a preestablished format.

In such a case, the reference data gives information about a reference execution of the program. The reference execution of the program is an execution of the program in the event that it has not been modified or altered by an attack that occurred following its installation in the device 1.

During step 102, the second processing unit 12 uses reference data to determine whether the execution of the program by the first processing unit 6 is compliant with that reference execution.

This compliance check produces two possible results: A positive result, in the event of compliance between the execution of the program and the reference execution, and a negative result otherwise (inconsistency between the executions). This negative result also reveals that the target program, or data manipulated by the target program, has been compromised.

One way of implementing such a compliance check is for the reference data to reference a sequence of events that is meant to occur in a certain order, or more generally, an event-oriented graph. For instance, those events are an execution pointer going through different locations in the program in a predefined order. Let us take as an example three code instructions A, B, C of the program. A is a code instruction of the program executed when it starts, B is a code instruction of the program found at the beginning of a function that is meant to be executed after A, and C is a code instruction of the program that is found at the end of that same function. In the event that the program is not modified or altered, the execution pointer of the first processing unit 6 is meant to go through the instructions A, then B, then C. On the other hand, if those three instructions are executed in a different order, such as B, then A, then C, this reveals that the program was altered after its initial installation.

Additionally, the second processing unit 12 detects the order in which the events referenced in the reference data occur during the execution of the program by the first processing unit 6.

The second processing unit then compares the predefined order in the reference data (A then B then C, in the example given above), and the order that it detected.

If both of the compared orders match, the result of the compliance check is positive. Otherwise, that result is negative.

Naturally, both of the aforementioned types of checks (data integrity/program execution compliance) may be combined in step 102. If they are, the overall result of the check implemented during step 102 is considered positive only if all of the underlying types of checks implemented during that step 102 have positive results.

The result of the check performed during step 102 is verified (step 104).

When the result of the check is positive, the second processing unit 12 commands the target program to resume (step 106), by issuing an appropriate command via the debug port 10.

When the result of the check is negative, the second processing unit 12 may command that the target program stop entirely (step 108), which means, unlike mere suspension, that data allocated in the first memory 8 during the execution of the target program is released. This stop is commanded via a stop command transmitted via the debug port 10.

When the result of the check is negative, the second processing unit 12 may also order a reconfiguration of the first electronic circuit 2 in a state which prevents subsequent execution of the program by the first processing unit 6. This is typically implemented via a reconfiguration command or which passes through the debug port 10.

For example, this reconfiguration command may alter the content of the first memory 8 (program data restoration for example, we may also consider acting on the RAM), alter the program execution (context, state) or by manipulating the internal peripherals of the first electronic circuit 2.

Furthermore, the second processing unit 12 generates a report indicating the result of the check 102 that was performed. This result may, for instance, be presented in the form of binary information (OK or error), or in a more detailed form (describing the type of check performed, etc.).

The generated report is transmitted to the remote server 3 (step 112), via a secure channel established between the communication interface 18 of the device 1 and the server 3.

The secure channel is typically established following an authentication between the device 1 and the server 3 involving at least one secret key. For instance, this authentication is a mutual authentication between the device 1 in the server 3 and/or uses a public key/private key-based cryptographic mechanism. The keys that are used may be stored in the memory 14 in a way that is protected from attacks.

The report that is generated may be transmitted in response to a negative result of the check 102 that is performed. However, it is important to remember that it is also advantageous to transmit that report even in the event that the check 102 that is performed has a positive result.

Step 112 of transmitting the report to the server 3 may be implemented in different ways.

In the first embodiment of the device 1 depicted in FIG. 1, the report does not pass through the first electronic circuit 2, because the communication interface 18 is part of the second electronic circuit 4. The report is simply sent by that communication interface 18 when commanded by the second processing unit 12.

In the embodiments of the device 1 depicted in FIGS. 2 and 3, the report passes through the first electronic circuit 2 before reaching the server 3.

In the second embodiment depicted in FIG. 2, the second processing unit 12 commands that the report be written, via the additional ports 22 and 20, in a previously allocated exchange zone within the first electronic circuit 2, typically in the first memory 8. For instance, the first processing unit 6 may periodically access the exchange zone to read it, and the report may be transmitted by the first electronic circuit 2 in response to such a reading within the exchange zone. In one variant, the transmission of the report is only triggered upon receipt, via the communication interface 18, of a request sent by the remote server 3.

In the third embodiment of the device 1 depicted in FIG. 3, the report travels through the first electronic circuit 2 before reaching the server 3, but in a way different from the second embodiment. A request sent by the server 3 is relayed by the first electronic circuit 2 to the second circuit, via the debug port 10. Upon receipt of that request, the second circuit is tasked with responding to it, by sending the report to the server 3. The report cannot go through the first processing unit 6 or the first memory 8. This exchange zone may be within the communication interface 18 and independent of the memory 8.

The transmission of the report to the server may be implemented in response to the receipt by the second circuit 4 of a message from the server 3 requesting a report.

For instance, the circuit 2 receives such a message from the server 3 via the communication interface 18. This message is stored either automatically owing to the architecture of the circuit 2 in the memory 8 (for instance, DMA), or via the executed program on the processing unit 6 (without DMA). Once the message has been stored, the processing unit 6 conducts a series of post-processing operations to extract from it any useful data, and formats the data so that it can be sent to the second circuit 4, and the processing unit 6 will execute a part of its program that controls the communication interface 10 to send that formatted message, either automatically or periodically, or when a request is received at the communication interface 10 sent via the communication interface 16 by the processing unit 12 (request to interrupt the communication interface 10).

Preferably, the transmission of the report is implemented while the target program is in a suspended state. This has the benefit of keeping the first electronic circuit 2 that is in a corrupted state from attempting to prevent the transmission of that message or alter its content so as to mislead the server 1 into believing that the second electronic circuit 4 had not detected any compromising.

There are two separate scenarios, which depend on the hardware capabilities of the communication interface 18 when the target program is suspended.

In a first case, the communication interface 18 is functional even when the target program has been suspended.

In a second case, the suspension of the target program also causes the communication interface 18 to be suspended; in other words, it becomes necessary to resume the execution of the target program in order for the communication interface 18 to also function. There may be two reasons behind this:

- A pure hardware reason, such as when suspension via the debug port 10 causes the communication interface 18 to stop receiving a supply to the clock
- A performance reason: going through the debug port 10 to write directly in the communication interface 18 is not effective enough to ensure stable, reliable communication.

In this second case, the following may be provided in a non-limiting embodiment in which the port 20 is a bus I²C.

- The second processing unit 12 suspends the first processing unit 6 via a stop point placed at the moment when the first unit 6 will go to sleep at the end of a cycle: at that moment, the first processing unit 6 has finished its critical operations and its communication with the outside world via the communication interface 18.
- The second processing unit 12 formats its messages to be sent to the outside world independently of the first processing unit 6.
- The second processing unit 12 saves the content of the configuration registers of an I²C peripheral of the first processing unit 6, for instance in the second memory 14.
- The second processing unit 12 writes in the configuration registers of the device I²C of the first processing unit 6 in order to prepare the communication to the world outside the device 1.
- The second processing unit 12 gradually writes in the register of the transmission buffer of the device I²C in order to transmit the formatted data to the outside world.
- The SE restores the content of the configuration registers of the device 120 of the MCU.
- The SE returns control to the MCU, which can then actually enter its sleep period.

In the second case, it is possible to add code into the first electronic circuit 2 which is dedicated to that manipulation performed by the first processing unit 6. For instance:

- A free zone is determined in the first memory 8.
- While the target program is suspended, the second processing unit 12 writes into the free zone a wait loop of the infinite loop type, as that loop may potentially assist the communication performed by the second processing unit 12. This loop may read a list of bytes from memory (exchange zone) and automatically send them to the I²C buffer. The second processing unit 12 forces a program counter change and saves the execution context of the first processing unit 6 so as to jump into the new wait loop.
- The second processing unit 12 commands the desired writing in the communication register of the communication interface 18, either via the debug port 10 (empty infinite loop), or via the written wait loop (infinite loop with communication assistance).
- Once the communication is complete, the second processing unit 12 restores the context and returns control to the target program.

Whenever the server 3 receives a report containing an error message, the server 3 may, for instance, order a remote shutdown of the first electronic circuit 2 if such a shutdown has not already been implemented autonomously by the second processing unit 12 during step 108. Alternatively, or additionally, the server 3 revokes the device 1, meaning that it prevents that device from accessing certain services (e.g. services of a network of connected objects to which the server 3 belongs).

When the result of the check verified in step 104 proves to be negative, the second processing unit 12 may command an update of the target program which until then was executed by the first processing unit 6 (step 114). This step is highly advantageous as it enables the first circuit 2 to be restored to a normal operating state.

During the update, a first version of the target program, which until then was stored in the first memory 8 and executed by the first processing unit, is replaced by a second version of the program.

The second program version may provide new functionalities and/or corrections in relation to the first version of the program.

The update command may be carried out in several different ways.

The second version of the target program may, for example, have been stored in advance in the first memory 8 at a different location from the first version of the program. During powering-on, the first processing unit 12 uses a memory address to determine which version of the target program to execute. Before the update, this memory address is the start address of the location where the first program version is stored in the first memory 14. To command an update, the second processing unit 12 sends to the first circuit 2, via the debut port 10, at least one command which orders the first processing unit 6 to change the program version to be executed. When this command is received, the first processing unit modifies the memory address mentioned above to the start address of the location where the second program version is stored in the first memory 8. One advantage of this embodiment is that the update command can be carried out very quickly, without needing to transmit a quantity of data to the first circuit 2. However, such an embodiment cannot be used if the storage capacity of the first memory is too low.

Alternatively, the second version of the program is transmitted by the second circuit 4 to the first circuit 2 via the debug port 10, and is then written to the first memory 8 so that the first processing unit 6 executes the second version of the program in place of the first version of the program. For example, the second version of the program is written at the memory location which until now was occupied by the first version of the program in the first memory 8.

This second version of the program may be obtained by the second processing unit 12 by downloading from a remote server (it will hereafter be assumed that this server is server 3, although this is not compulsory). This is advantageous as it enables a recent version of the program to be obtained.

Alternatively, this second version may be stored in the second memory 14 or in a third memory of the device 1 to which the second processing unit has read access. In this case, the second processing unit 12 obtains the second version of the program by simple read access to the memory concerned. This variant is advantageous as it offers the possibility of updating the program even when this program version cannot be downloaded from the server 3. One other advantage of this variant is that the origin of the second version of the program can be guaranteed. Generally, the version stored in the memory 8 or the third-party memory is a security version ("failsafe") of the program, intended to operate normally.

Very preferentially, the second processing unit first tries to establish a secure communication channel with the server 3 via the communication interface 18 in order to download a new version of the target program. If this attempt is successful, the second processing unit 12 receives a new version of the target program from the server 3. The second processing unit 12 sends via the debug port 10 the program version it has received from the server 3 via the secure communication channel. On the other hand, if the attempt to establish a secure communication channel fails, the second processing unit 12 reads the program version stored in the second memory 8 or the third-party memory. The attempt to establish the communication channel may in particular fail due to the first circuit 2 in the embodiments represented in FIGS. 2 and 3, wherein the second circuit 4 must pass through the first circuit 2 to communicate with the server 3.

Regardless of the original location of the second version of the target program used for the update (the first memory 8, the second memory 14, the third-party memory of the device 1 or the external server 3), it is preferable that this second version be signed digitally and/or be in an encrypted state at its original location. In this case, the second processing unit 12 implements verification of the digital signature and/or decryption of the second version of the target program, before requesting the first processing unit 12 to use it in place of the first version of the target program.

The preceding steps are repeated whenever the target program is suspended again.

In the foregoing, embodiments have been presented in which the check of step 102 is implemented while the program is suspended. The benefit of the suspension is that it greatly simplifies the implementation of the check that is performed. However, it should be noted that such a suspension is not mandatory, though it is advantageous. This is because it may be foreseen that the second processing unit 12 injects, via the debug port 10, special code instructions aimed at triggering, during their execution by the first processing unit 6, the sending to the second circuit 4 of data to be checked during the check step 102. The execution of the injected code and the sending of data that is verified may be performed without suspending the program.

It is also understood that step 108 of command stop, step 110 of report generation and step 114 of update command constitute alternative measures which are likely to be implemented in isolation one from the other, but that they may also be carried out together within the same embodiment.

The invention claimed is:

1. A device such as a connected object comprising a first electronic circuit comprising:
   a first processing unit configured to execute a program,
   a first memory configured to memorize data from the program or manipulated by the program during its execution,
   a debug port dedicated to checking the execution of the program from outside the first circuit,
   the device further comprising a second electronic circuit connected to the debug port, the second electronic circuit comprising:
   a second memory memorizing reference data related to the program,
   a second processing unit configured to implement the following steps automatically and autonomously via the debug port: checking the integrity of the data memorized by the first memory and/or the compliance of the program's execution by the first processing unit with a reference execution, assisted by the reference data,
   wherein the steps implemented automatically and autonomously by the second processing unit comprise a command for a definitive program stop and/or a reconfiguration of the first electronic circuit in a state which prevents subsequent execution of the program by the first processing unit, when the program or the data manipulated by the program is revealed to have been compromised during the checking.

2. The device according to claim 1, wherein the steps implemented automatically and autonomously by the second processing unit further comprise a program suspension command, the integrity check and/or compliance step being implemented while the program is suspended.

3. The device according to claim 2, wherein the suspension command comprises the placement of a stop point at a predetermined location in the program, so as to suspend the program at the predetermined location, or the placement of an observation point on a variable of the program, so as to suspend the program when the variable is modified.

4. The device according to claim 3, wherein the steps implemented automatically and autonomously by the second processing unit comprise a step consisting of verifying whether a condition independent of the way in which the program is being executed has been met, such as verifying whether a predetermined period of time has elapsed since a previous start of the program, a previous resumption of the program, or a previous powering-on of the device, the suspension command step being implemented when the condition is met.

5. The device according to claim 1, wherein the steps implemented automatically and autonomously by the second processing unit comprise the command for the first processing unit to resume the program when the program or the data manipulated by the program is revealed not to have been compromised during the check step, and where this command is not implemented when the program or the data manipulated by the program is revealed to have been compromised during the check step.

6. A device such as a connected object comprising a first electronic circuit comprising:
   a first processing unit configured to execute a program,
   a first memory configured to memorize data from the program or manipulated by the program during its execution,
   a debug port dedicated to checking the execution of the program from outside the first circuit,
   the device further comprising a second electronic circuit connected to the debug port, the second electronic circuit comprising:
   a second memory memorizing reference data related to the program,
   a second processing unit configured to implement the following steps automatically and autonomously via the debug port checking the integrity of the data memorized by the first memory and/or the compliance of the program's execution by the first processing unit with a reference execution, assisted by the reference data,
   the device further comprising a communication interface with a server, and wherein the steps implemented automatically and autonomously by the second processing unit comprise the generation of a report indicating whether the program or the data manipulated by the program was revealed to have been compromised during the check step and the command the transmission the report to the server via the communication interface while the program is suspended.

7. The device according to claim 6, wherein the communication interface is configured to transmit the report to the server without the report going through the first electronic circuit or being part of the first electronic circuit.

8. The device according to claim 7, wherein:
the steps implemented automatically and autonomously by the second processing unit comprise the command, via the debug port, for the report to be written in an exchange zone allocated in the first memory, so that the report can thereafter be relayed to the server via the communication interface or wherein
the first electronic circuit comprises a second port distinct from the debug port, and wherein the steps implemented automatically and autonomously by the second processing unit comprise the command for the report to be transmitted to the communication interface via the second port, so that the error message can thereafter be relayed to the server via the communication interface.

9. A device such as a connected object comprising a first electronic circuit comprising:
a first processing unit configured to execute a program,
a first memory configured to memorize data from the program or manipulated by the program during its execution,
a debug port dedicated to checking the execution of the program from outside the first circuit,
the device further comprising a second electronic circuit connected to the debug port, the second electronic circuit comprising:
a second memory memorizing reference data related to the program,
a second processing unit configured to implement the following steps automatically and autonomously via the debug port checking the integrity of the data memorized by the first memory and/or the compliance of the program's execution by the first processing unit with a reference execution, assisted by the reference data, wherein:
the reference data indicate a sequence of events that occur in a predetermined order during the reference execution of the program, and wherein the compliance check of the program's execution against a reference execution comprises a comparison between the predetermined order and an order in which the events occur during the execution of the program by the first processing unit, or
the steps implemented automatically and autonomously by the second processing unit comprise a program update command when the program or the data manipulated by the program is revealed to have been compromised during the check step, the first memory memorizes a first version of the program and a second version of the program before the update order, the first processing unit is configured to execute selectively the first version of the program before the update and wherein the update command comprises the sending to the first electronic circuit, via the debug port, of at least one command which requests the first processing unit to execute selectively the second version of the program memorized in the first memory in place of the first version of the program.

10. The device according to claim 9, wherein the first processing unit is configured to execute a first version of the program before the update and the update command comprises the sending to the first electronic circuit, via the debug port, of a second version of the program obtained by the second electronic circuit so that the first processing unit executes the second version of the program in place of the first version of the program.

11. The device according to claim 10, wherein the update command comprises a download of the second version of the program from a remote server away from the device, or a reading of the second version of the program in a device memory, such as the second memory.

12. The device according to claim 11, wherein the second version is read in the memory of the device only when an attempt to establish a secure communication channel between the second processing unit and the server fails.

13. The device according to claim 9, wherein the update command comprises a verification of a digital signature of the second version of the program, or a decryption of the second version of the program.

14. A method implemented in a device such as a connected object, the device comprising:
a first electronic circuit comprising a first processing unit configured to execute a program, a first memory configured to memorize data from the program or manipulated by the program during its execution, and a debug port dedicated to checking the execution of the program from outside the first circuit,
a second electronic circuit connected to the debug port and comprising a second memory memorizing reference data related to the program,
the method implemented by a second processing unit of the second electronic circuit, automatically and autonomously via the debug port checking the integrity of the data memorized by the first memory and/or the compliance of the program's execution by the first processing unit with a reference execution, assisted by the reference data,
wherein implemented automatically and autonomously by the second processing unit comprising a command for a definitive program stop and/or a reconfiguration of the first electronic circuit in a state which prevents subsequent execution of the program by the first processing unit, when the program or the data manipulated by the program is revealed to have been compromised during the checking.

15. A non-transitory computer readable medium comprising program code instructions for executing the method according to claim 14, when said method is executed by said second processing unit.

* * * * *